United States Patent
Hertz et al.

(10) Patent No.: US 9,359,510 B2
(45) Date of Patent: Jun. 7, 2016

(54) IN-STORE TINTABLE NON-INFRARED-ABSORPTIVE PAINT AND STAIN SYSTEM

(71) Applicant: Valspar Sourcing, Inc., Minneapolis, MN (US)

(72) Inventors: Sanford Lee Hertz, Hoffman Estates, IL (US); Matthew S. Gebhard, Cary, IL (US)

(73) Assignee: Valspar Sourcing, Inc., Minneapolis, MN (US)

(*) Notice: Subject to any disclaimer, the term of this patent is extended or adjusted under 35 U.S.C. 154(b) by 222 days.

(21) Appl. No.: 14/269,867

(22) Filed: May 5, 2014

(65) Prior Publication Data

US 2014/0299605 A1    Oct. 9, 2014

Related U.S. Application Data

(63) Continuation of application No. 13/148,275, filed as application No. PCT/US2010/023650 on Feb. 9, 2010, now Pat. No. 8,746,291.

(60) Provisional application No. 61/151,105, filed on Feb. 9, 2009.

(51) Int. Cl.
*C09D 7/00* (2006.01)
*B01F 13/10* (2006.01)
(Continued)

(52) U.S. Cl.
CPC ............ *C09D 7/007* (2013.01); *B01F 13/1055* (2013.01); *C09D 5/004* (2013.01); *C09D 7/1216* (2013.01); *C09D 7/14* (2013.01); *C08K 3/0033* (2013.01); *C08K 3/22* (2013.01)

(58) Field of Classification Search
CPC . B01F 13/1055; B01F 2215/005; C09D 7/14; C09D 7/007
USPC ............ 141/9, 11, 100, 104, 18, 83; 106/400, 106/401, 493, 499; 427/160, 419.2
See application file for complete search history.

(56) References Cited

U.S. PATENT DOCUMENTS

| 4,335,759 A | 6/1982 | Pattiniemi et al. |
|---|---|---|
| 4,424,292 A | 1/1984 | Ravinovitch et al. |

(Continued)

FOREIGN PATENT DOCUMENTS

| WO | WO 91/15547 A1 | 10/1991 |
|---|---|---|
| WO | WO 2005/095528 A2 | 10/2005 |
| WO | WO 2006/040033 A1 | 4/2006 |

OTHER PUBLICATIONS

Resene, Point of sale tinting systems—the 6$^{th}$ decade of use a user's perspective, 6 pages (copy dated Jun. 16, 2015 with asserted 2004 Version Date).

(Continued)

*Primary Examiner* — Timothy L Maust
*Assistant Examiner* — Timothy P Kelly
(74) *Attorney, Agent, or Firm* — IPLM Group, P.A.

(57) ABSTRACT

A custom color paint or stain tinting system employs a dark-colored non-infrared-absorptive liquid base paint or stain and a point-of-sale array of concentrated liquid colorants which when dispensed into the base paint or stain provide custom-tinted non-infrared-absorptive paints or stains in lightened shades and a variety of tints. Dark custom-tinted paints or stains are tinted lighter from a dark-colored base, not darker from a white or light colored base as is done in conventional point-of-sale systems.

20 Claims, 3 Drawing Sheets

(51) Int. Cl.
*C09D 5/33* (2006.01)
*C09D 7/12* (2006.01)
*C09D 7/14* (2006.01)
*C08K 3/00* (2006.01)
*C08K 3/22* (2006.01)

(56) References Cited

U.S. PATENT DOCUMENTS

| | | | |
|---|---|---|---|
| 4,427,835 | A | 1/1984 | Bush et al. |
| 4,468,498 | A | 8/1984 | Kowalski et al. |
| 4,469,825 | A | 9/1984 | Kowalski et al. |
| 4,546,045 | A | 10/1985 | Elias |
| 4,594,363 | A | 6/1986 | Blankenship et al. |
| 4,880,842 | A | 11/1989 | Kowalski et al. |
| 4,920,160 | A | 4/1990 | Chip et al. |
| 4,985,064 | A | 1/1991 | Redlich et al. |
| 5,036,109 | A | 7/1991 | Chip et al. |
| 5,041,464 | A | 8/1991 | Hoshino et al. |
| 5,157,084 | A | 10/1992 | Lee et al. |
| 5,375,634 | A | 12/1994 | Egger |
| 5,409,776 | A | 4/1995 | Someya et al. |
| 5,510,422 | A | 4/1996 | Blankenship et al. |
| 5,607,995 | A | 3/1997 | Wassermann |
| 6,454,848 | B2 | 9/2002 | Sliwinski et al. |
| 6,616,744 | B1 | 9/2003 | Sainz et al. |
| 6,989,056 | B2 | 1/2006 | Bäbler |
| 7,157,112 | B2 | 1/2007 | Haines |
| 7,201,191 | B2 | 4/2007 | Heatley et al. |
| 7,343,941 | B2 | 3/2008 | Heatley et al. |
| 8,141,599 | B2 | 3/2012 | Korenkiewicz et al. |
| 2005/0070640 | A1 | 3/2005 | Bäbler |
| 2007/0095421 | A1 | 5/2007 | Page |
| 2008/0187708 | A1 | 8/2008 | Decker et al. |
| 2008/0257446 | A1 | 10/2008 | Oakes |
| 2008/0290099 | A1 | 11/2008 | MacDonald et al. |

OTHER PUBLICATIONS

Resene, Architects memos (2009), downloaded from the Internet Archive capture for Feb. 13, 2009 at: https://web.archive.org/web/20090213085243/http://resene.co.nz/archspec/archmemo/memoindx.htm.

Resene, Architects memos—Technical information (2010), downloaded from the Internet Archive capture for Sep. 24, 2010 at: https://web.archive.org/web/20100924011102/http://www.resene.co.nz/archspec/archmemo/memoindx.htm.

Resene, Architects memos—Technical information (2011), downloaded from the Internet Archive capture for May 19, 2011 at: https://web.archive.org/web/20110519162622/http://www.resene.co.nz/archspec/archmemo/memoindx.htm.

Resene, Point of Sale Tinting Systems—the 6$^{th}$ Decade of Use a User's Perspective, 13 page PDF of HTM format document downloaded format from the Internet Archive capture for Oct. 15, 2011 at: https://web.archive.org/web/20111015121748/http://resene.co.nz/archspec/archmemo/point_of_sale_tinting.htm.

Resene, Point of Sale Tinting Systems—the 6$^{th}$ Decade of Use a User's Perspective, 5 page PDF with May 4, 2011 Document Properties Created Date, downloaded from the Internet Archive capture for Dec. 8, 2011 at: https://web.archive.org/web/20111208213738/http://resene.co.nz/archspec/archmemo/Point_of_sale_tinting.pdf.

Resene, Who is Resene?, Stipplecote to SpaceCote and beyond—Resene product development, 20 pages (2006).

Resene Cool Colours, Keep your cool . . . with Resene Cool Colours, 2 pages (2007).

Resene Total Colour System, BS5252 colour range, 5 pages (2008).

Resene Total Colour System, BS5252 colour range, 5 pages (2014).

Resene Roof Paint Systems, 5 pages (2004).

Response to Comments on Proposed Revisions to Standard for Paints and Coatings (GS-11) Proposed Revisions for Public Comment, pp. 1-49 (Dec. 6, 2007).

The Difference Between Primer and Undercoat, PaintPRO, vol. 3, No. 5, 2 pages (2001).

Arctic Infrared Reflective Pigments, Pigments for Coatings, The Shepherd Color Company, 2 pages (2007).

Introduction to IR, Reflective Pigments, 5 pages (Aug. 2005).

Colors to go—Xfast® POS, BASF The Chemical Company, 6 pages (2007).

Cool down your paints, BASF The Chemical Company, 8 pages (2008).

Hyde et al., Investigation of Infrared Reflective Pigmentation Technologies for Coatings and Composite Applications (Composites 2006 Convention and Trade Show, American Composites Manufacturers Association, Oct. 18-20, St. Louis, MO (2006)).

"Plasticolors", Product Information Sheets, 3 sheets, http://www.plasticolors.com/reflective_technology.php (2005).

"On the Hunt for Cooler Products", Product Information Sheets, Arctic Infrared Reflective Pigments, The Shepherd Color Company, 2 pages (2002).

It's the Pigment!, The Shepherd Color Company, Version 22, 2 pgs. (Jan. 2003).

"Pigment Dispersions utilize IR reflective technology", Archive News Story, Thomas Net Industrial News Room, 4 pages (Aug. 30, 2007).

GEODE Complex Inorganic Color Pigments, "Product Information V-799 Cool Colors™ IR Black", Ferro Corporation, 1 Page (2004).

GEODE Complex Inorganic Color Pigments, "Product Information V-780 Cool Colors™ IR Black", Ferro Corporation, 1 Page (2004).

GEODE Complex Inorganic Color Pigments, "Product Information V-778 Cool Colors™ IR Black", Ferro Corporation, 1 Page (2004).

GEODE Complex Inorganic Color Pigments, "Product Information 10201 Eclipse™ Black", Ferro Corporation, 1 Page (2004).

GEODE Complex Inorganic Color Pigments, "Product Information 10202 Eclipse™ Black", Ferro Corporation , 1 Page (2004).

GEODE Complex Inorganic Color Pigments, "Product Information 10203 Eclipse™ Black", Ferro Corporation, 1 Page (2004).

GEODE Complex Inorganic Color Pigments, "Product Information 10364 Brown", Ferro Corporation, 1 Page (2004).

IN-STORE TINTABLE NON-INFRARED-ABSORPTIVE PAINT AND STAIN SYSTEM

CROSS REFERENCE TO RELATED APPLICATIONS

This application is a continuation of application Ser. No. 13/148,275 filed Aug. 5, 2011, now allowed, which is in turn a national stage filing under 35 U.S.C. §371 of International Application No. PCT/US2010/023650 filed Feb. 9, 2010, which in turn claims priority under 35 U.S.C. §119 to U.S. Provisional Application No. 61/151,105 filed Feb. 9, 2009, the disclosures of which are incorporated herein by reference.

FIELD

This invention relates to point-of-sale customized-color architectural paint and stain tinting systems, such as those used in retail paint stores to make custom-tinted house paints or stains.

BACKGROUND

Architectural paint and stain manufacturers typically distribute premixed paints and stains in a small number of popular colors. To accommodate consumer desires and enable matching of existing painted or stained surfaces, manufacturers typically also distribute a set of tintable base paints or stains and several concentrated colorants. These are combined at point-of-sale outlets using colorant dispensing and shaker mixing equipment to make small batch lots of custom-tinted paint or stain in a much larger array of colors than the limited color array available in premixed products.

Owing in part to industry custom and the available colorant dispensing equipment, the custom color systems from different paint or stain manufacturers tend to have somewhat similar components. For example, a typical custom color paint system may employ several (e.g., 2 to 4) tintable base paints ranging for example from a bright white base intended to accept at most a small quantity of colorant (viz., having a relatively small available headspace in the base paint container), to a relatively unpigmented clear base intended to accept a much larger quantity of colorant (viz., in a container initially containing for example about 9-10% less base than the bright white base and consequently having greater available headspace for colorant addition). Base paints and stains may employ various binders (e.g., natural or synthetic resins), binder forms (e.g., solution polymers or latex polymers) and vehicles (e.g., solvent-borne or water-borne versions), and may provide various dried surface finishes (e.g., matte, semi-gloss or gloss finishes). Some manufacturers also sell colored base paints (e.g. a red, a blue and yellow colored base) which are intended to be combined with additional colorant(s) when one coat hiding power is desired for strongly-tinted custom paint shades. The colorants in custom color paint or stain systems may for example be volumetrically metered from a multiple-colorant dispensing station, with 12 paint or stain colorants typically being employed in colorant dispensing stations for the U.S. market, and more (e.g., 16 or 24 colorants) sometimes being employed in other markets. The black colorant in such custom color systems typically contains a suspension of carbon black particles. Some paint bases are also shaded with carbon black to improve hiding. Carbon black is highly infrared-absorptive.

Homes and other buildings in tropical and other sunny regions normally are painted or stained in light colors to minimize solar gain. If tinted with some of the dark colorants employed in conventional custom color systems, the resulting paints or stains would in many cases be undesirably infrared-absorptive. Some paint manufacturers have developed premixed infrared-reflective external paints having dark colors, using relatively expensive infrared-reflective dark pigments. These premixed paints are available in a limited color palette.

SUMMARY OF THE INVENTION

We have found that by employing (i) a dark-colored (e.g., grey or black) liquid base paint or stain employing non-infrared-absorptive dark pigment, (ii) an optional white liquid base paint or stain, and (iii) an array of concentrated liquid colorants made without requiring infrared-absorptive pigments, we can provide a point-of-sale custom color paint or stain tinting system having a low number of bases and colorants, and having the capability to provide custom-tinted interior or exterior non-infrared-absorptive paints or stains in a wide gamut range of tints ranging from light pastels to dark colors. The resulting paints and stains have low heat buildup when exposed to bright sunlight even when made up in dark custom-tinted colors. Notably, the dark custom-tinted paints or stains or the present invention are tinted lighter from a dark-colored base, not darker from a white or light colored base as is done in conventional point-of-sale systems. The disclosed system may optionally also include additional non-infrared-absorptive base paints or stains (e.g., a gray liquid base paint or stain made with white pigment and non-infrared-absorptive dark pigment) to facilitate making some intermediate tints and shades.

The invention thus provides, in one aspect, a custom color paint or stain tinting system comprising a dark-colored non-infrared-absorptive liquid base paint or stain, and a point-of-sale array of concentrated liquid colorants which are substantially free of infrared-absorptive pigments and which when dispensed into the dark-colored base paint or stain will provide custom-tinted non-infrared-absorptive paints or stains in lightened shades and a variety of tints.

The invention provides, in another aspect, a method for custom paint or stain tinting, which method comprises selecting one or more colorants from a point-of-sale array of concentrated liquid colorants which are substantially free of infrared-absorptive pigments and dispensing the selected colorant(s) into a dark-colored non-infrared-absorptive liquid base paint or stain to provide custom-tinted non-infrared-absorptive paints or stains in lightened shades and a variety of tints.

The disclosed system and method permit point-of-sale formulation and sale of dark-colored custom-tinted non-infrared-absorptive exterior paints and stains while avoiding or minimizing added inventory, dedicated dispensers or dedicated floor space.

BRIEF DESCRIPTION OF THE DRAWING

Like reference symbols in the various figures of the drawing indicate like elements. The elements in the drawing are not to scale.

DETAILED DESCRIPTION

Figure 1:
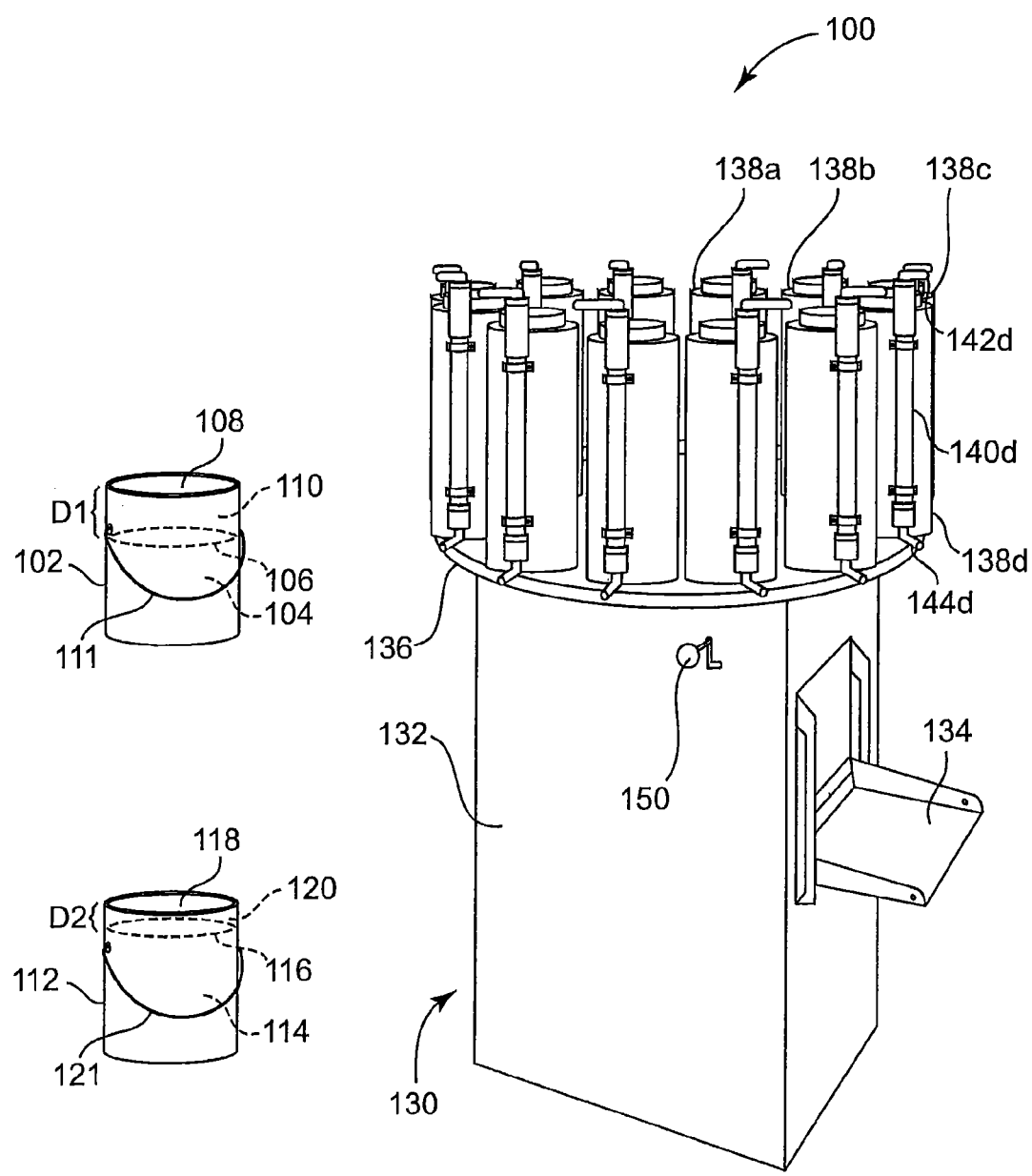
FIG. 1 and FIG. 2 are perspective views of embodiments of the disclosed paint or stain tinting system.

Unless the context indicates otherwise the following terms shall have the following meaning and shall be applicable to the singular and plural:

The terms "a," "an," "the," "at least one," and "one or more" are used interchangeably. Thus, for example, a colorant composition that contains "a" pigment means that the colorant composition may include "one or more" pigments.

The terms "architectural paints" and "architectural stains" respectively mean paints and stains for use on interior or exterior building or construction surfaces, e.g., walls, trim, floors, decks, railings, ceilings, roofs (including metal roofing, shingles and tiles), roadways, sidewalks, etc.

The term "automated colorant dispenser" means a dispenser for paint or stain colorants which is controlled or controllable via electronically-regulated precision pumps or other electronically-regulated fluid flow management devices so as to meter automatically quantities of one or more liquid colorants into a base paint or stain container and thereby facilitate preparation of tinted paints or stains whose tints are selected from an array of tints. The amounts and types of colorants selected by such an automated colorant dispenser will optionally and preferably be controlled using software and a suitable database.

The term "binder" means a film-forming natural or synthetic polymer suitable for use in a paint or stain.

The terms "blue-hued", "green-hued" and "red-hued" respectively refer to the blue, green and red principal hues in the Munsell color system.

The term "concentrated liquid colorant" means a composition added to a point-of sale container whose interior volume is largely (e.g., two thirds of the container volume or more) but not completely already filled with a base paint or stain so as to alter the hue or lightness of such base paint or stain, and which contains pigment or dye and an optional vehicle but is substantially free of binder.

The term "custom-tinted" when used with respect to a system or method for tinting base paints or stains means that one or more colorants can be dispensed into a base paint or stain and mixed to provide finished paint or stains in a wide variety (e.g., more than one hundred or even more than one thousand) of preselected formulated colors or, if desired, a match for randomly-selected colors. The preselected formulated colors will ordinarily be viewed by potential end users using printed color charts or displayed computer images.

The term "dark-colored" when used with respect to a paint or stain means that the paint or stain has an L* value less than 60 as determined by casting a 25 µm dry thickness coating film over the white part of a BYK-Gardner No. PA-2811 opacity drawdown chart (from BYK-Gardner USA) and measuring L* as defined in the ASTM International Standards on Color and Appearance Measurement: 8th Edition.

The term "non-infrared-absorptive" when used with respect to a paint or stain means that the paint or stain when cast as an at least 40 µm dry thickness coating film over the white part of the above-mentioned BYK-Gardner opacity drawdown chart will have a total solar reflectance (TSR) of at least 10 as measured using the procedure of ASTM E-971-88 (Reapproved 2003). TSR is a measure of the total percentage of incident solar radiation reflected by an object, and a 10 TSR value means that 10% of the total solar radiation is reflected by the object. The term "non-infrared-absorptive" when used with respect to a colorant or pigment means that when sufficient such colorant or pigment is added to a clear base paint so as to provide an opaque (as defined below) film when cast as an at least 40 µm dry thickness coating film over the white and black parts of the above-mentioned BYK-Gardner opacity drawdown chart, the dry film will have a TSR of at least 10 as measured over the white part of the drawdown chart.

The term "manual colorant dispenser" means a dispenser for paint or stain colorants which is equipped with manually-movable pistons whose strokes have been indexed to meter manually quantities of one or more liquid colorants into a base paint or stain container and thereby facilitate preparation of tinted paints or stains whose tints are selected from an array of tints.

The term "minimum fluid dispensing quantity" means the smallest amount, expressed on a volumetric basis, of liquid colorant that can reliably be dispensed by a manual or automated colorant dispenser. In case the dispenser controls the weight rather than volume of dispensed colorant, the phrase "minimum fluid dispensing quantity" means the mass of fluid corresponding to a recited volumetric amount. Dispenser reliability may be evaluated visually, by preparing a series of custom-tinted paint batches with the same tint recipe and comparing the appearance of painted samples made using the batches to ascertain if any batch-to-batch differences in appearance can be observed by an average human observer. Dispenser reliability may also be evaluated quantitatively, using for example the CIELAB color difference formula $\Delta E = [\Delta L^2 + \Delta a^2 + \Delta b^2]^{1/2}$ and selecting a dispenser which can provide batch-to-batch variations of 0.5 $\Delta E$ units or less.

The term "opaque" when used in respect to a dry coating film means that the film has a contrast ratio greater than 95%. The contrast ratio is determined by dividing the L* value measured over the black portion of the above-mentioned BYK-Gardner opacity drawdown chart by the L* value measured over the white portion.

The term "paint" means a coating composition including pigment and binder which when applied to form a thin (e.g., 100 µm) wet thickness coating film on a freshly-sanded smooth wood surface, will when dried hide both the wood grain and its texture and will present a new surface with its own appearance.

The term "pigment volume concentration" when used in respect to a paint, stain or colorant means the total percentage of dried coating volume occupied by all pigment species in the coating.

The term "point-of-sale" means a site at which custom-mixed paints or stains are tinted and mixed in small batch lots (e.g., one half pint, one pint, one quart, one liter, one gallon, four liter, five gallon or 20 liter containers, corresponding to containers from about 0.2 to 20 L) for sale to end-users (e.g., painters, builders and homeowners). Representative point-of-sale outlets include retail paint stores, hardware stores, building supply stores (including warehouses), and distribution centers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "solvent-borne" when used in respect to a paint, stain or colorant means that the major liquid vehicle or carrier for the paint, stain or colorant is a nonaqueous solvent or mixture of nonaqueous solvents.

The term "stain" means a coating composition including binder which when applied to form a thin (e.g., 100 µm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

When used with respect to a component which may be found in a paint, stain or colorant composition, the term "substantially free of" means containing less than about 1 wt. % of the component based on the composition weight.

The term "water-borne" when used in respect to a paint, stain or colorant means that the major liquid vehicle or carrier for the paint, stain or colorant is water.

The recitation of a numerical range using endpoints includes all numbers subsumed within that range (e.g., 1 to 5 includes 1, 1.5, 2, 2.75, 3, 3.80, 4, 5, etc.).

FIG. 1 shows a perspective view of an embodiment 100 of the disclosed paint and stain mixing system. Dark base paint or stain container 102 holds dark-colored liquid base paint or stain 104 containing at least one non-infrared-absorptive pigment (not shown in FIG. 1). The upper surface 106 (shown in phantom view) of dark base paint or stain 104 is located a sufficient distance D1 below container lid 108 so that an ample headspace 110 is available for the addition of one or more colorants to prepare a lightened paint or stain with a custom hue. Handle 111 may be used to carry container 102. Optional white base paint or stain container 112 holds white liquid base paint or stain 114 containing at least one white pigment (e.g., titanium dioxide, not shown in FIG. 1). The upper surface 116 (also shown in phantom view) of white base paint or stain 114 is located a sufficient distance D2 below container lid 118 so that a headspace 120 is available for the addition of one or more colorants to prepare a darkened paint or stain with a custom hue. Distance D2 typically will be less than distance D1 owing to the lower colorant amounts which might be required to tint white base paint or stain 114 to a satisfactory hue. Handle 121 may be used to carry container 112. Base paint or stain containers 102 or 112 may be filled with concentrated colorant using manual colorant dispenser 130. Dispenser 130 includes cabinet 132 on which is mounted shelf 134 where containers 102 or 112 may be placed for colorant addition. Turntable 136 includes a series of refillable colorant dispenser canisters (twelve in this case, four of which are numbered as 138a, 138b, 138c and 138d) containing a point-of-sale array of liquid colorants which are substantially free of infrared-absorptive pigments and which when dispensed into the dark-colored base paint or stain will provide custom-tinted non-infrared-absorptive paints or stains in lightened shades and a variety of tints (e.g., at least red, blue and green tints). Canister 138d includes a metered dispensing cylinder 140d containing a piston and connecting link (neither of which is shown in FIG. 1) joined to movable handle 142d whose position can be adjusted vertically along cylinder 140d to provide for the metered delivery of colorant from canister 138d through dispensing outlet 144d and into a container such as base paint or stain container 102 or 112 placed on shelf 134. The remaining canisters include similar but unnumbered metered dispensing cylinders, pistons, connecting links, handles and dispensing outlets. Release lever 150 permits turntable 136 to be rotated as needed to bring each colorant canister in line above shelf 134 and locked into place while colorant is metered and dispensed into a base paint or stain container.

Figure 2:
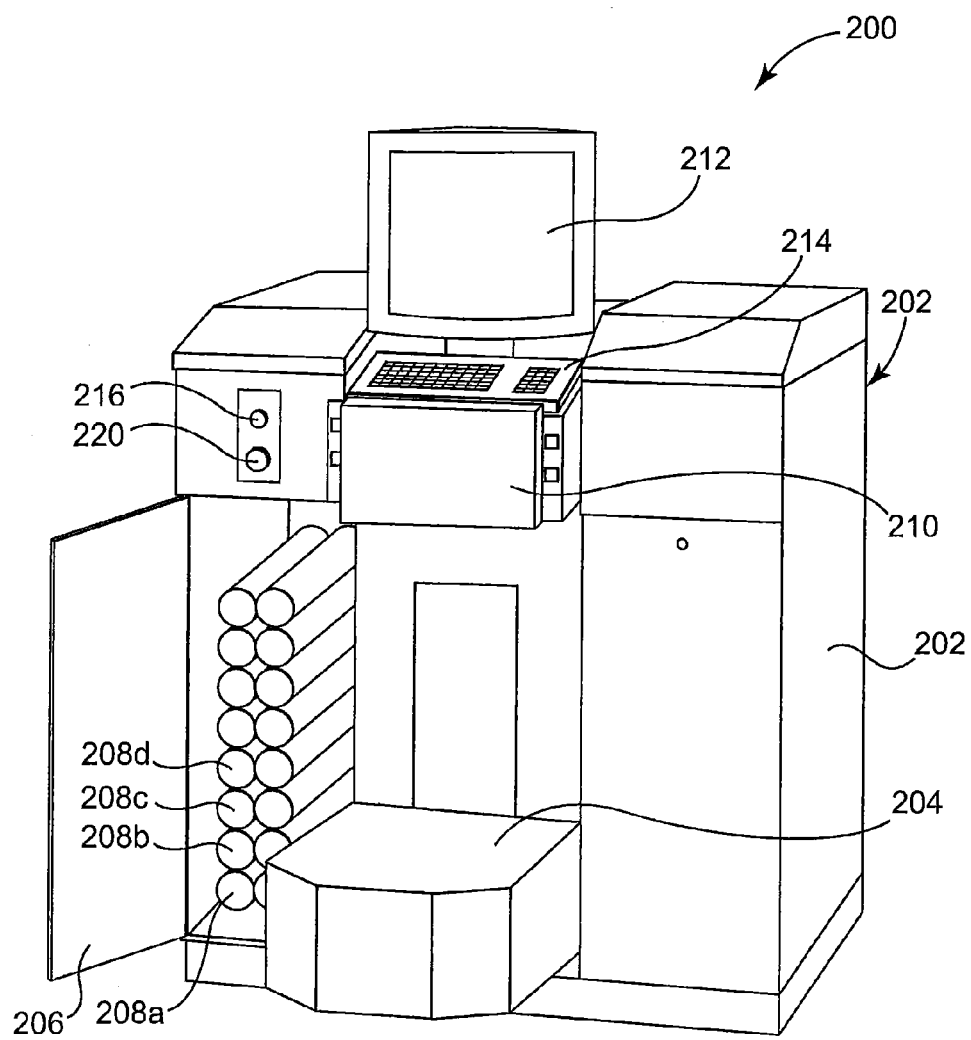
Figure 2:
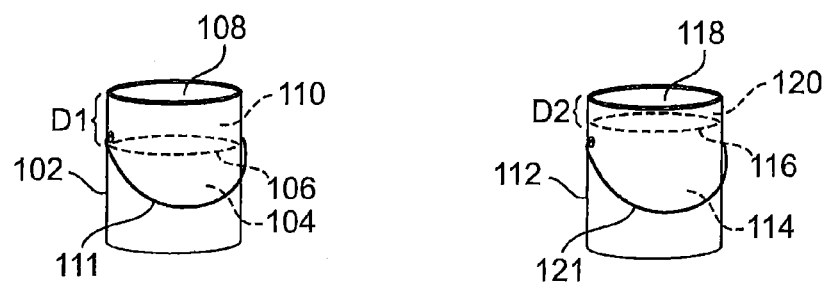

FIG. 2 shows a perspective view of an embodiment 200 of the disclosed paint and stain mixing system. Base paint or stain containers 102 and 112 are as in FIG. 1, and may be filled with colorant using automated colorant dispenser 202. Dispenser 202 includes a shelf 204 where containers 102 or 112 may be placed for colorant addition. Cabinet 206 holds a series of replaceable colorant dispenser canisters (sixteen in this case, four of which are numbered as 208a, 208b, 208c and 208d) containing a point-of-sale array of liquid colorants which are substantially free of infrared-absorptive pigments and which when dispensed into the dark-colored base paint or stain will provide custom-tinted non-infrared-absorptive paints or stains in lightened shades and a variety of tints. Concentrated colorant is dispensed from the canisters through suitable internal plumbing in cabinet 206 (not shown in FIG. 2) and suitable dispensing nozzles (not shown in FIG. 2) positioned in dispensing head 210, and thence into a base paint or stain container. A monitor 212 and keyboard 214 permit information and commands to be entered into dispenser 202. A barcode reader (not shown in FIG. 2) may be used to read information from paint or stain sample cards or base paint or stain containers to assist in controlling the system. A power button 216 and emergency off button 220 may be used to start and stop dispenser 202.

Figure 3:
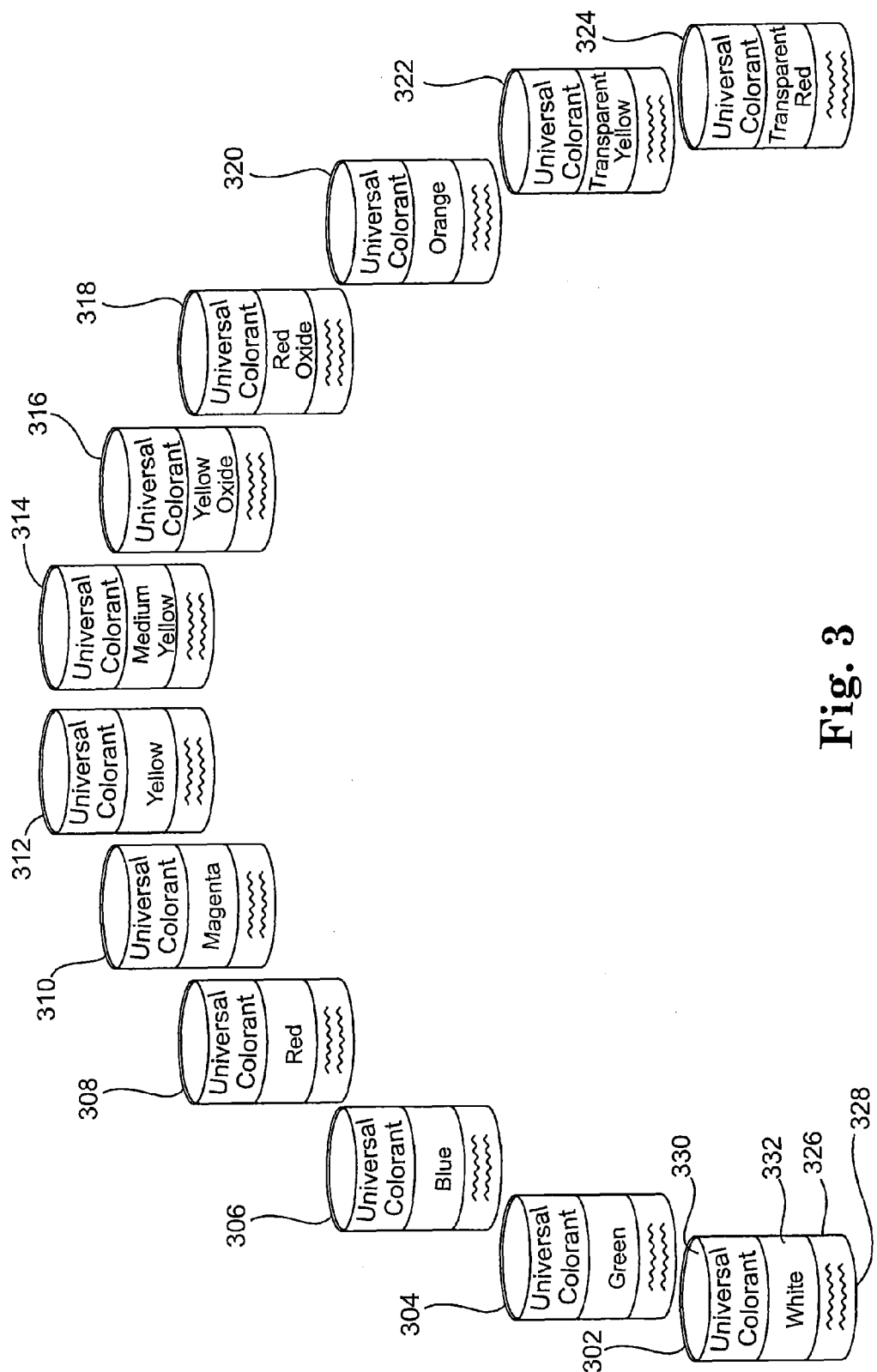
FIG. 3 is a perspective view of an embodiment of the disclosed colorant array.

FIG. 3 is a perspective view of a point-of-sale colorant array 300 with twelve containers 302 through 324. Container 302 includes side 326, bottom 328, top 330 and label 332, and contains a non-infrared-absorptive white liquid colorant. Top 330 preferably is puncturable, shearable or otherwise penetrable, and may resemble the top used in soup cans. Containers 304 through 324 also contain non-infrared absorptive pigments, and respectively provide green, blue, red, magenta, yellow, medium yellow, yellow oxide, red oxide, orange, transparent yellow iron oxide and transparent red iron oxide colorants. The colorants in containers 302 through 320 will typically be added to paint or stain bases to provide tinted paints and stains, and the colorants in containers 322 and 324 will typically be added to clear stain bases to provide tinted transparent or semi-transparent stains. The colorants in containers 302 through 324 preferably are substantially free of or free of infrared-absorptive pigments.

A variety of liquid base paints, stains and colorants may be used in the disclosed system and method. The base paints and stains normally will contain one or more polymeric binders and one or more pigments, and may in addition contain one or more vehicles or carriers and one or more adjuvants. The colorants normally will contain one or more pigments, and may in addition contain one or more vehicles or carriers and one or more adjuvants.

The binders may be in a variety of forms including latex polymers and solution polymers. Exemplary binders include but are not limited to acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, drying oil modified polymers such as polyesters and polyurethanes, polyamides, epoxy esters, polyureas, polyurethanes, polysiloxanes, silicones, fluorinated copolymers such as vinylidene fluoride, and blends of any of the above polymeric binders. The base paints, stains or colorants may include a component or components of a multicomponent (e.g., two component) reactive system for the binder such as a component of an isocyanate-polyamine, isocyanate-polyol, epoxy-polyamine, carbodiimide-polyacid, aziridine-polyacid, melamine-polyol, or urea formaldehyde-polyol system. The binder may for example represent about 5 to about 99 volume percent of the dried coating volume. The volume solids, as defined by the fractional volume of dry paint ingredients in the as-supplied wet paint, may for example represent about 5 to about 80 volume percent of the base paint. The pigment volume concentration, as defined by the fractional volume of pigment in the dry paint ingredients, may for example represent 0.25 to about 95 volume percent of the dark-colored non-infrared-absorptive base paint. The glass transition temperature for the polymeric binder may for example be about −20 to about 60° C. The base paint viscosity may for example be about 60 to about 140 Krebs units.

A variety of pigments may be employed in the base paints, stains and colorants. The pigments desirably form a stable dispersion that does not require agitation prior to use. The pigments in the dark base paint or stain and one or more (and preferably all) of the pigments in the array of colorants are non-infrared-absorptive. The dark base paint or stain normally will include at least a black non-infrared-absorptive pigment and the array of colorants normally will include at least six colorants respectively containing non-infrared-absorptive white, yellow-hued, green-hued, blue-hued, red-hued and black pigments. The colorant array may also include colorants with other hues, e.g., additional non-infrared-absorptive concentrated liquid colorants such as medium yellow, yellow oxide, red oxide and magenta. The colorant array desirably is free of or substantially free of infrared-absorptive pigments, and the pigments in the array may consist of or consist essentially of non-infrared-absorptive pigments.

Exemplary non-infrared-absorptive dark pigments may be inorganic or organic in nature, and include but are not limited to those referred to in U.S. Pat. Nos. 6,458,848 B2, 6,616,744 B1, 6,989,056 B2 and 7,157,112 B2. Inorganic pigments are especially desirable and include single or mixed metal oxides formed from a variety of metals, e.g., from aluminum, antimony, bismuth, boron, chromium, cobalt, gallium, indium, iron, lanthanum, lithium, magnesium, manganese, molybdenum, neodymium, nickel, niobium, silicon, tin, vanadium or zinc. Exemplary metal oxides include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$ and $Mn(Sb,Fe)O_3$. The metal oxide may have a corundum-hematite crystal lattice structure as described in the above-mentioned U.S. Pat. No. 6,454,848 B2, or may be a host component having a corundum-hematite crystalline structure which contains as a guest component one or more elements selected from aluminum, antimony, bismuth, boron, chromium, cobalt, gallium, indium, iron, lanthanum, lithium, magnesium, manganese, molybdenum, neodymium, nickel, niobium, silicon, tin, vanadium and zinc. A variety of non-infrared-absorptive dark pigments are commercially available, including mixed metal oxide pigments such as those supplied by Ferro Corporation (Cleveland, Ohio) under the COOL COLORS™ and ECLIPSE™ trademarks, for example V-778 COOL COLORS IR Black, V-780 COOL COLORS IR Black, V-799 COOL COLORS IR Black, 10201 ECLIPSE Black, 10202 ECLIPSE Black and 10203 ECLIPSE Black; mixed metal oxide pigments such as those supplied by Shepherd Color Company (Cincinnati, Ohio) under the ARTICT™ trademark, for example ARTIC Black 376, ARTIC Black 10C909, ARTIC Black 411 and ARTIC Black 30C940; mixed metal oxide pigments such as those supplied by Tomatec America, Inc. (Florence, Ky.) under the numbers 42-707A and 707V10; and perylene-based or other organic colorants such as those supplied by BASF (Florham Park, N.J.) under the PALIOGEN™ trademark including PALIOGEN Black S 0084. A variety of non-infrared-absorptive pigments in colors other than black may be obtained from these same or other suppliers and employed in the base paints, stains or colorant array. In some instances these pigments may also be referred to as dyes. Exemplary non-black pigments include inorganic pigments such as titanium dioxide, iron oxide, zinc oxide, magnesium silicates, calcium carbonate, aluminosilicates, silica and various clays; organic pigments including plastic pigments such as solid bead pigments (e.g., polystyrene or polyvinyl chloride beads) and microsphere pigments containing one or more voids and vesiculated polymer particles (e.g., those discussed in U.S. Pat. Nos. 4,427,835, 4,920,160, 4,594,363, 4,469,825, 4,468,498, 4,880,842, 4,985,064, 5,041,464, 5,036,109, 5,157,084, 5,409,776, and 5,510,422). Other exemplary non-infrared-absorptive pigments include EXPANCEL™ 551DE20 acrylonitrile/vinyl chloride expanded particles (from Expancel Inc., Duluth, Ga.), SIL-CEL™ 43 glass micro cellular fillers (from Silbrico Corporation, Hodkins, Ill.), FILLITE™ 100 ceramic spherical particles (from Trelleborg Fillite Inc., Norcross, Ga.), SPHERICEL™ hollow glass spheres (from Potter Industries Inc., Valley Forge, Pa.), 3M ceramic microspheres including grades G-200, G-400, G-600, G-800, W-210, W-410, and W-610 (from 3M, St. Paul, Minn.); 3M hollow microspheres including 3M Performance Additives iM30K (also from 3M), INHANCE™ UH 1900 polyethylene particles (from Fluoro-Seal Inc., Houston, Tex.), and BIPHOR aluminum phosphate (from Bunge Fertilizantes S.A., Brazil). Colorants or colorant arrays containing entirely inorganic pigments or pigment mixtures may be preferred where custom-tinted paints or stains having maximum exterior durability are desired.

When the available number of colorant dispenser canisters is limited (e.g., when using 12 canister dispensers), the number of colorant Stock Keeping Units (SKUs) may be reduced by recognizing that some individual colorants are themselves mixtures of pigments which may be replaced with a precisely-metered blend of individual colorants. For example, many custom color paint systems employ one or more earth-tone colorants variously referred to using names such as brown oxide, raw umber or umber. Although brown oxide colorant is sometimes referred to as being made from a single pigment (e.g., PBr7 natural iron oxide), it may actually have been made using a blend of red and yellow oxides (e.g., PR101 red iron oxide and PY42 yellow iron oxide) shaded with carbon black (e.g., PBk7 carbon black) to match a specific color target. Raw umber or umber earth-tone colorants (which may collectively be referred to as "raw umber" colorants) likewise may have been made from a blend of colored oxides and carbon black. These blends of individual pigments are undesirably infrared-absorptive due to the carbon black presence, but may be replaced by colorant blends wholly made from (or substantially wholly made from) non-infrared-absorptive pigments of appropriate coloration. The resulting replacement colorant blends may be dispensed into the base paint or stain as individual pigments using an automated colorant dispenser having a suitably low minimum fluid dispensing quantity (e.g., a minimum fluid dispensing quantity less than 0.01 fluid ounce (<0.3 mL)) so as to enable accurate replication of hues made using the original infrared-absorptive blend but with non-infrared absorbing colorants. Further details regarding the manner in which such blends may be dispensed may be found in copending U.S. patent application Ser. No. 12/141,006 filed Jun. 17, 2008 and entitled EXPANDED COLOR SPACE ARCHITECTURAL PAINT AND STAIN TINTING SYSTEM. For example, a blend made using precisely-metered small amounts of non-infrared-absorptive yellow oxide colorant, non-infrared-absorptive red oxide colorant and non-infrared-absorptive black pigment may be dispensed into the base paint or stain whenever an exterior paint or stain with a brown oxide or raw umber tint is required.

An exemplary array of concentrated liquid colorants suitable for providing custom-tinted non-infrared-absorptive paints or stains in at least 1000 unique point-of-sale colors could for example be made using the seven colorant hues shown below in Table A:

TABLE A

Seven Colorant Array

| Colorant Hue | Pigment(s) | Preferred Wt. % Pigment |
|---|---|---|
| White | CI PW6 | 30-60 |
| Green | CI PG7 | 5-50 |
| Blue | CI PB15: 2 | 5-30 |
| Red | CI PR3, CI PR112, CI PR209 or CI 254 | 5-70 |
| Yellow | CI PY65, CI PY73, CI PY74 or CI PY184 | 5-30 |
| Yellow Oxide | CI PY42 | 30-70 |
| Red Oxide | CI PR101 | 30-70 |

The array may include additional non-infrared-absorptive colorants. Exemplary arrays of 10, 12 and 14 non-infrared absorptive colorants are shown below in Tables B, C and D:

TABLE B

Ten Colorant Array

| Colorant Hue | Pigment(s) | Preferred Wt. % Pigment |
|---|---|---|
| White | CI PW6 | 30-60 |
| Green | CI PG7 | 5-50 |
| Blue | CI PB15: 2 | 5-30 |
| Red | CI PR3, CI PR112, CI PR209 or CI 254 | 5-70 |
| Magenta | CI PR122 | 4-25 |
| Yellow | CI PY65, CI PY73, CI PY74 or CI PY184 | 5-30 |
| Medium Yellow | CI PY74 or PY65 | 10-50 |
| Yellow Oxide | CI PY42 | 30-70 |
| Red Oxide | CI PR101 | 30-70 |
| Orange | CI PO74 | 5-30 |

TABLE C

Twelve Colorant Array

| Colorant Hue | Pigment(s) | Preferred Wt. % Pigment |
|---|---|---|
| White | CI PW6 | 30-60 |
| Green | CI PG7 | 5-50 |
| Blue | CI PB15: 2 | 5-30 |
| Red | CI PR3, CI PR112, CI PR209 or CI 254 | 5-70 |
| Magenta | CI PR122 | 4-25 |
| Yellow | CI PY65, CI PY73, CI PY74 or CI PY184 | 5-30 |
| Medium Yellow | CI PY74 or PY65 | 10-50 |
| Yellow Oxide | CI PY42 | 30-70 |
| Red Oxide | CI PR101 | 30-70 |
| Orange | CI PO74 | 5-30 |
| Transparent Yellow Oxide | CI PY42 | 10-50 |
| Transparent Red Oxide | CI PR101 | 10-50 |

TABLE D

Fourteen Colorant Array

| Colorant Hue | Pigment(s) | Preferred Wt. % Pigment |
|---|---|---|
| White | CI PW6 | 30-60 |
| Green | CI PG7 | 5-50 |
| Green Chromium Oxide | CI PG17 | 25-70 |
| Blue | CI PB15: 2 | 5-30 |
| Cobalt Aluminate Blue | CI PB28 | 25-70 |
| Red | CI PR3, CI PR112, CI PR209 or CI 254 | 5-70 |
| Magenta | CI PR122 | 4-25 |
| Yellow | CI PY65, CI PY73, CI PY74 or CI PY184 | 5-30 |
| Medium Yellow | CI PY74 or PY65 | 10-50 |
| Yellow Oxide | CI PY42 | 30-70 |
| Red Oxide | CI PR101 | 30-70 |
| Orange | CI PO74 | 5-30 |
| Transparent Yellow Oxide | CI PY42 | 10-50 |
| Transparent Red Oxide | CI PR101 | 10-50 |

The white (titanium dioxide) colorant in the disclosed arrays may receive somewhat heavier use than in a conventional custom color system, because the white colorant may frequently be used to lighten the dark base paint or stain whereas in a conventional custom color system a white colorant will mainly be used to increase hiding for selected light or dark shades. Mixtures of pigments may be used to make individual colorants in the disclosed arrays. For example, a red colorant may be made from a mixture of CI Ry112 and CI PR209 pigments. A variety of pigments may also be used to obtain a specific color index value. For example, a CI PR101 transparent red iron oxide pigment may employ SICOTRANS™ Red L 2816 or SICOTRANS Red L 2817 from BASF, and a CI PR101 transparent yellow iron oxide pigment may employ SICOTRANS Yellow L 1915 or SICOTRANS Yellow L 1916 from BASF. The disclosed arrays may also include a black non-infrared absorptive colorant, e.g., one made using PALIOGEN Black S 0084 pigment.

If sufficient space is available in the intended colorant dispenser, the colorant array may optionally be supplemented by one or more extra colorants containing substantial amounts of infrared-absorptive pigments. Exemplary such extra colorants include carbon black or lamp black colorant (CI PBK7), black iron oxide colorant, brown oxide colorant and raw umber colorant (CI PBR7). These extra colorants may be used to prepare custom color paints or stains for situations (e.g., some interior painting) in which infrared absorption might not be objectionable. These extra colorants may also be used to tint a traditional white paint or stain base darker as is normally done in a conventional custom color system, and might be provided in hues different from or matching those of the non-infrared-absorptive colorants but with appropriate packaging, labeling, software controls or other measures to prevent accidental cross-contamination of non-infrared-absorptive custom color paints or stains made with the disclosed system and method. When such infrared-absorptive extra colorants are present, they will not be considered to be part of the disclosed point-of-sale array of concentrated liquid colorants which are substantially free of infrared-absorptive pigments, and will instead be regarded as supplementing the array.

The disclosed system may if desired employ an existing set of colorants one or more of which contains an infrared-absorptive pigment (e.g., a black, brown oxide or raw umber colorant containing carbon black). In such case the colorants containing infrared-absorptive pigments may be avoided or entirely omitted when making tinted exterior paints or stains, and the disclosed dark-colored non-infrared-absorptive liquid base paint or stain may instead be used to make custom-tinted exterior paints or stains by dispensing into the base one or more colorants selected from an array of the non-infrared-absorptive colorants.

The base paints, stains and colorants may be solvent-borne, water-borne, or 100% solids. A variety of vehicles or carriers may be employed in solvent-borne or water-borne embodiments. Exemplary solvents (and exemplary volatile organic compounds or VOCs which may be added to water-borne embodiments to improve coating properties or to aid in coating application) include glycol ethers, organic esters, aromatic compounds, and ethylene or propylene glycols. The disclosed base paints, stains and colorants preferably are low VOC dispersions containing 0.01 to less than 8 wt. % VOCs, more preferably 0.01 to less than 6 wt. % VOCs, yet more preferably 0.01 to less than 4 wt. % VOCs, and most preferably 0.01 to less than 2 wt. % VOCs based upon the total liquid composition weight. The disclosed colorants preferably also are universal colorants whose vehicles and other ingredients render them suitable for use in solvent-borne, water-borne and 100% solids paint or stain formulations.

The disclosed base paints, stains, colorants and finished tinted paints or stains may include a variety of adjuvants, including but not limited to adhesion promoters, antioxidants, biocides, buffers, coalescing agents, defoamers, dispersants, dyes, extender fillers, humectants, leveling agents, neutralizers, optical brighteners, pearlescents, plasticizers, polymeric additives, preservatives, reactive diluents, rheology modifiers or thickeners, surfactants, tackifiers, ultraviolet stabilizers (e.g., hindered amine light stabilizers) and waxes.

The dark-colored base paint or stain has an L* value less than 60, more preferably less than 50, and most preferably less than 35. The dark-colored base paint or stain also preferably has a TSR greater than 10, preferably greater than 15, and most preferably greater than 20. The finished tinted paints or stains may for example have a TSR greater than 10, greater than 15, greater than 20, greater than 25 or greater than 35. The disclosed system and method have particular utility for mixing dark custom-tinted paints or stains with both low L* values (e.g., less than 50 or less than 35) and high TSR values (e.g., greater than 15 or greater than 20). The finished tinted paints and stains desirably are made by adding one or more colorants to a single base paint or stain, and without adding other ingredients such as additional binders, additional dry ingredients or other adjuvants.

The liquid colorants desirably have PVC values of about 0.1 to about 30 vol. %, preferably about 0.5 to about 25 vol. %, and more preferably about 1 to about 25 vol. %. The amount of colorant(s) added to a 1 gallon (3.78 L) nominal container of base paint or stain will vary in part depending on the base paint, stain or colorant PVC values and may for example range from about 0.00065 fluid ounces (0.19 mL) to about 16 fluid ounces (473 mL) of colorant addition, with larger amounts typically being employed in the dark-colored base paints or stains and smaller amounts typically being employed in a white base paint or stain. The finished tinted paints or stains desirably have PVC values of about 0.5 to about 85 vol. % and preferably about 1 to about 50 vol. %.

The base paints and stains typically will be packaged in containers suitable for point-of-sale mixing of small batch lots in custom colors and subsequent sale in the same container to the end user of a custom-tinted paint or stain. Exemplary small batch lot base paint or stain container sizes are about one half pint, one pint, one quart, one liter, one gallon, four liter, five gallon or 20 liter containers, corresponding to base paint or stain containers from about 0.2 to 20 L. The base paint or stain container typically will be equipped with an openable and recloseable lid, cap or other closure for an opening through which colorant may be dispensed into the base paint or stain. Depending on the amount of pigment already present in a base paint or stain, the base paint or stain container typically will have a small headspace (e.g., about 1 to about 15% of the container volume) for colorant addition. For example, a nominal one gallon (3.79 L) dark-colored base paint or stain container may hold up to about 112 fluid ounces (3.31 L) or up to about 116 fluid ounces (3.43 L) of the base paint or stain, respectively leaving at least about 16 fluid ounces (0.47 L or about 13% of the total container volume) or at least about 12 fluid ounces (0.35 L or about 9% of the total container volume) available for colorant addition. A nominal one gallon (3.79 L) white base paint or stain container may for example hold about 128 fluid ounces (3.79 L) of the base paint or stain, with only a small headspace (e.g., about 0.04 L or about 1% of the total container volume) available for colorant addition. When additional base paints or stains of intermediate lightness are employed, they likewise may have intermediate available headspace volumes for colorant addition. For example, a three base system may employ the dark-colored and white base paints or stains mentioned above, together with a non-infrared-absorptive gray base whose container has up to about 120 fluid ounces (3.55 L) or up to about 124 fluid ounces (3.57 L) of base paint or stain with at least about 8 fluid ounces (0.24 L) or at least about 4 fluid ounces (0.12 L) of headspace available for colorant addition. Additional non-infrared-absorptive chromatic base paints or stains (e.g., red, blue or yellow base paints or stains) may be employed if desired for making strongly-tinted custom paint shades with potential one coat hiding power.

The colorants typically will be packaged in containers suitable for use in the chosen colorant dispenser(s), and sold to the dispenser owner or operator in a point-of-sale custom tinting facility rather than to the end user of a custom-tinted paint or stain. Exemplary small batch lot colorant container sizes are about 0.5, 1, 2 or 3 quarts; about 1 gallon; or about 0.5, 1, 2, 3, 4 or 5 liters, corresponding to colorant containers from about 0.5 to about 5 L. Exemplary colorant containers include boxes, cans, cartridges, jars, pouches (e.g., sealed pouches made of metal or plastic), squeeze bottles, syringes, tubes (e.g., collapsible tubes such as toothpaste-style tubes made of metal or plastic, and more rigid tubes equipped with movable pistons or plungers such as caulking-style tubes made of metal, plastic or paper) and other containers in which the colorant can be sealed for storage and shipment and, when needed to replace an empty container, placed in an appropriate slot or other receptacle or poured into an appropriate hopper or other vessel in the colorant dispenser so that colorant may be dispensed by the colorant dispenser in controlled amounts. The containers may be supplied to the dispenser owner or operator in a can or other sealed container designed to be opened using a can opener or other can-puncturing device. The containers may be equipped with a manually-openable closure such as an openable and recloseable cap, or may be equipped with an irreversibly openable closure such as a tear-off seal or rupturable septum. In any event, once the container has been opened, colorant may be supplied to the colorant dispenser and thence into the base paint or stain container. Desirably the container, colorant dispenser or both have a nozzle, adapter orifice or other design which facilitates clean entry of the colorant into the colorant dispenser with minimal spillage or waste before or after use. As supplied to the dispenser owner or operator, the colorant container typically will include little or no headspace.

A variety of manual or automated colorant dispensers may be used in the disclosed system and method, including the COROB™ D50 manual colorant dispenser with a ¹/₄₈ fluid ounce (0.62 mL) minimum dispensing capacity from CPS Color Equipment, Inc., the ACCUTINTERT™ 1500, 2000, 7000 and 8000 series automated colorant dispensers with a ¹/₃₈₄ fluid ounce (0.077 mL) minimum dispensing quantity from Fluid Management, Inc., and the Sample Dispensing System automated colorant dispenser with a ¹/₁₀₂₄ fluid ounce (0.029 mL) minimum dispensing quantity from Fluid Management, Inc. Additional automated paint or stain colorant dispensers include the COROB MODULA HF™ machine with a ¹/₁₉₂ fluid ounce (0.153 mL) minimum dispensing quantity from CPS Color Equipment, Inc., and the TATO-COLOR™ machine with a ¹/₃₈₄ fluid ounce (0.077 mL) minimum dispensing quantity from CPS Color Equipment, Inc. The chosen dispenser may for example have a minimum fluid dispensing quantity less than 0.01 fluid ounce (<0.3 mL), preferably less than 0.007 fluid ounce (<0.2 mL) and more preferably less than 0.005 fluid ounce (<0.15 mL). Dispensers with even smaller minimum dispensing quantities may be employed, e.g. less than 0.001 fluid ounce (<0.03 mL) or less than 0.0002 (<0.014 mL) minimum dispensing quantities, but such dispensers may also require longer amounts of time to prepare strong colors in large containers.

The disclosed custom-color architectural paint and stain tinting systems may be applied to a variety of substrates, e.g., asphalt (including asphalt composition shingles), cement, cement fiberboard, ceramics, concrete, metal, plastic and wood (including monolithic, engineered and veneered wood).

The invention is further described in the following Examples, in which all parts and percentages are by weight unless otherwise indicated.

Comparative Example A

A carbon-black pigmented dark-colored base paint may be prepared by combining the ingredients listed below in Table E. As shown in Table E, the VOC value would be less than 2%. Based on optical modeling, the L* value would be less than 40, and the TSR would be less than 10%.

TABLE E

| Ingredient | Supplier | Parts |
|---|---|---|
| Water | | 250 |
| KATHON ™ LX 1.5% Biocide | Rohm and Haas Co. | 1.8 |
| Acrylic Latex (50% Solids) | Rohm and Haas Co. | 484.0 |
| Propylene Glycol | | 10.6 |
| TEXANOL ™ Ester Alcohol | Eastman Chemical Co. | 4.8 |
| BYK ™-348 Surfactant | Byk-Chemie | 2.0 |
| FOAMSTAR ™ A-34 Defoamer | Cognis | 2.0 |
| Ammonia (28%) | | 0.4 |
| ACRYSOL ™ RM-2020 NPR Rheology Modifier | Rohm and Haas Co. | 30.3 |
| ACRYSOL SCT-275 Rheology Modifier | Rohm and Haas Co. | 4.5 |
| Water | | 95.8 |
| No. 1991 Predispersed Carbon Black | EPS/CCA | 60 |
| Total | | 1104.2 |
| Volatile Organic Compounds (VOCs) | | <2.00% |
| Lightness (L*) | | <40 |
| Total Solar Reflection (TSR) | | <10% |

Example 1

A Perylene Black pigmented dark-colored base paint may be prepared by combining the ingredients listed below in Table 1. The Example 1 base paint would provide VOC and L* values comparable to those of Comparative Example A while providing a significantly greater TSR value.

TABLE 1

| Ingredient | Supplier | Parts |
|---|---|---|
| Water | | 250 |
| KATHON LX 1.5% Biocide | Rohm and Haas Co. | 1.8 |
| Acrylic Latex (50% Solids) | Rohm and Haas Co. | 484.0 |
| Propylene Glycol | | 10.6 |
| TEXANOL Ester Alcohol | Eastman Chemical Co. | 4.8 |
| BYK-348 Surfactant | Byk-Chemie | 2.0 |
| FOAMSTAR A-34 Defoamer | Cognis | 2.0 |
| Ammonia (28%) | | 0.4 |
| ACRYSOL RM-2020 NPR Rheology Modifier | Rohm and Haas Co. | 30.3 |
| ACRYSOL SCT-275 Rheology Modifier | Rohm and Haas Co. | 4.5 |
| Water | | 95.8 |
| Predispersed Perylene Black (7 vol. % PALIOGEN ™ Black S 0084) | BASF | 60 |
| Total | | 1104.2 |
| Volatile Organic Compounds (VOCs) | | <2.00% |
| Lightness (L*) | | <40 |
| Total Solar Reflection (TSR) | | >40% |

Example 2

A mixed metal oxide pigmented dark-colored base paint may be prepared by combining the ingredients listed below in Table 2. The Example 2 base paint would provide VOC and L* values comparable to those of Comparative Example A while providing a significantly greater TSR value.

TABLE 2

| Ingredient or Step | Supplier | Parts |
|---|---|---|
| Grind/Pre-Mix: | | |
| Water | | 152.8 |
| TAMOL ™ 165A Dispersant | Rohm and Haas Co. | 6.0 |
| Propylene Glycol | | 8.6 |
| ARTIC ™ Black 30C940 Pigment | Shepherd Color Co. | 336 |
| KATHON LX 1.5% Biocide | Rohm and Haas Co. | 1.8 |
| LetDown: | | |
| Acrylic Latex (50% Solids) | Rohm and Haas Co. | 484.0 |
| Propylene Glycol | | 2.0 |
| TEXANOL Ester Alcohol | Eastman Chemical Co. | 4.8 |
| BYK-348 Surfactant | Byk-Chemie | 2.0 |
| FOAMSTAR A-34 Defoamer | Cognis | 2.0 |
| Ammonia (28%) | | 0.4 |
| ACRYSOL RM-2020 NPR Rheology Modifier | Rohm and Haas Co. | 30.3 |
| ACRYSOL SCT-275 Rheology Modifier | Rohm and Haas Co. | 4.5 |
| Water | | 95.8 |
| Total | | 1131.0 |
| Volatile Organic Compounds (VOCs) | | <2.00% |
| Lightness (L*) | | <40 |
| Total Solar Reflection (TSR) | | >20% |

Example 3

A mixed metal oxide pigmented dark-colored base paint may be prepared by combining the ingredients listed below in Table 3. The L* value would be less than 60 and the TSR value would be greater than 25%.

TABLE 3

| Ingredient or Step | Supplier | Parts |
|---|---|---|
| Grind/Pre-Mix: | | |
| Water | | 112 |
| TAMOL 165A Dispersant | Rohm and Haas Co. | 6.0 |
| Propylene Glycol | | 8.6 |
| ARTIC Black 30C940 Pigment | Shepherd Color Co. | 168 |
| Universal Grade Titanium Dioxide Slurry | E. I. DuPont de Nemours & Co. | 170 |
| KATHON LX 1.5% Biocide | Rohm and Haas Co. | 1.8 |
| LetDown: | | |
| Acrylic Latex (50% Solids) | Rohm and Haas Co. | 484.0 |
| Propylene Glycol | | 2.0 |
| TEXANOL Ester Alcohol | Eastman Chemical Co. | 4.8 |
| BYK-348 Surfactant | Byk-Chemie | 2.0 |
| FOAMSTAR A-34 Defoamer | Cognis | 2.0 |
| Ammonia (28%) | | 0.4 |
| ACRYSOL RM-2020 NPR Rheology Modifier | Rohm and Haas Co. | 30.3 |
| ACRYSOL SCT-275 Rheology Modifier | Rohm and Haas Co. | 4.5 |
| Water | | 95.8 |
| Total | | 996.4 |
| Volatile Organic Compounds (VOCs) | | <2.00% |
| Lightness (L*) | | <60 |
| Total Solar Reflection (TSR) | | >25% |

Example 4

A mixed metal oxide pigmented dark-colored base paint may be prepared by combining the ingredients listed below in Table 4. The L* value would be less than 40 and the TSR value would be greater than 20%.

TABLE 4

| Ingredient or Step | Supplier | Parts |
|---|---|---|
| Grind/Pre-Mix: | | |
| Water | | 102.2 |
| TAMOL 165A Dispersant | Rohm and Haas Co. | 6.0 |
| BYK-348 Surfactant | Byk-Chemie | 2.0 |
| FOAMSTAR A-34 Defoamer | Cognis | 1.0 |
| MINEX ™ 10 Nepheline Syenite | Unimin Specialty Minerals, Inc. | 7.5 |
| ARTIC Black 30C940 Pigment | Shepherd Color Co. | 332 |
| KATHON LX 1.5% Biocide | Rohm and Haas Co. | 1.8 |
| LetDown: | | |
| Acrylic Latex (50% Solids) | Rohm and Haas Co. | 454.2 |
| ROPAQUE ™ Ultra Hollow Sphere Polymeric Pigment | Rohm and Haas Co. | 23.5 |
| Propylene Glycol | | 9.0 |
| TEXANOL Ester Alcohol | Eastman Chemical Co. | 4.5 |
| FOAMSTAR A-34 Defoamer | Cognis | 1.0 |
| Ammonia (28%) | | 0.8 |
| ACRYSOL RM-2020 NPR Rheology Modifier | Rohm and Haas Co. | 33.0 |
| ACRYSOL SCT-275 Rheology Modifier | Rohm and Haas Co. | 5.0 |
| Water | | 147.4 |
| Total | | 1130.9 |
| Volatile Organic Compounds (VOCs) | | <2.00% |
| Lightness (L*) | | <40 |
| Total Solar Reflection (TSR) | | >20% |

Example 5

A mixed metal oxide pigmented dark-colored base paint may be prepared by combining the ingredients listed below in Table 5. The L* value would be less than 40 and the TSR value would be greater than 20%.

TABLE 5

| Ingredient or Step | Supplier | Parts |
|---|---|---|
| Grind/Pre-Mix: | | |
| Water | | 79.9 |
| ARTIC Black 30C940 Pigment | Shepherd Color Co. | 263.8 |
| TAMOL 165A Dispersant | Rohm and Haas Co. | 3.6 |
| MINEX 10 Nepheline Syenite | Unimin Specialty Minerals, Inc. | 50.0 |
| FOAMSTAR A-34 Defoamer | Cognis | 1.0 |
| KATHON LX 1.5% Biocide | Rohm and Haas Co. | 1.8 |
| LetDown: | | |
| RHOPLEX VSR-1050 Acrylic Emulsion | Rohm and Haas Co. | 472.3 |
| ROPAQUE Ultra Hollow Sphere Polymeric Pigment | Rohm and Haas Co. | 49.2 |
| TEXANOL Ester Alcohol | Eastman Chemical Co. | 4.6 |
| Propylene Glycol | | 10.8 |
| BYK-348 Surfactant | Byk-Chemie | 1.6 |
| Ammonia (28%) | | 0.4 |
| ACRYSOL RM-2020 NPR Rheology Modifier | Rohm and Haas Co. | 26.0 |
| ACRYSOL SCT-275 Rheology Modifier | Rohm and Haas Co. | 2.2 |
| Water | | 93.0 |
| Total | | 1060.2 |
| Volatile Organic Compounds (VOCs) | | <2.00% |
| Lightness (L*) | | <40 |
| Total Solar Reflection (TSR) | | >20% |

Example 6

A mixed metal oxide pigmented dark-colored base paint may be prepared by combining the ingredients listed below in Table 6. The L* value would be less than 40 and the TSR value would be greater than 20%.

TABLE 6

| Ingredient or Step | Supplier | Parts |
|---|---|---|
| Grind/Pre-Mix: | | |
| NATROSOL ™ 250 MHR Hydroxyethyl Cellulose (2.5%) | Ashland, Inc. | 100.8 |
| Water | | 37.7 |
| TAMOL 165A Dispersant | Rohm and Haas Co. | 17.6 |
| TRITON ™ CF-10 Surfactant | Dow Chemical Co. | 2.2 |
| FOAMASTER ™ SA-3 Defoamer | Cognis | 1.0 |
| KATHON LX 1.5% Biocide | Rohm and Haas Co. | 1.8 |
| ARTIC Black 30C940 Pigment | Shepherd Color Co. | 260.0 |
| MINEX 4 Nepheline Syenite | Unimin Specialty Minerals, Inc. | 175.0 |
| DIAFIL ™ 525 Diatomaceous Earth | World Minerals, Inc. | 12.5 |
| LetDown: | | |
| Water | | 37.7 |
| RHOPLEX VSR-1050 Acrylic Emulsion | Rohm and Haas Co. | 375.0 |
| ROPAQUE Ultra Hollow Sphere Polymeric Pigment | Rohm and Haas Co. | 48.7 |
| FOAMASTER SA-3 Defoamer | Cognis | 1.5 |
| TEXANOL Ester Alcohol | Eastman Chemical Co. | 4.0 |
| Propylene Glycol | | 12.2 |
| ACRYSOL RM-2020 NPR Rheology Modifier | Rohm and Haas Co. | 17.5 |
| Water | | 73.5 |
| Total | | 1178.7 |
| Volatile Organic Compounds (VOCs) | | <2% |
| Lightness (L*) | | <40 |
| Total Solar Reflection (TSR) | | >20% |

Example 7

A red shaded finished paint may be created by placing a dark-colored base paint in a point-of sale container and adding an appropriate colorant chosen from a concentrated colorant array to provide a custom-tinted paint with a lighter color. In an exemplary run, 0.92 L (31 fluid ounces) of the Example 3 base paint may be placed in a 0.95 L (1 quart) paint can equipped with a removable, friction-sealed lid, leaving about 0.03 L (1 fluid ounce) of headspace above the base paint. Using an automated or manual colorant dispenser, 0.03 L (1 fluid ounce) of No. 1947 Predispersed Red Colorant from CCA/EPS may be added to the base paint. The paint can may be sealed by replacing the lid, and the paint may be mixed to a uniform color by placing the sealed can in a vibratory paint shaker for 3 minutes. The resulting custom-tinted paint would have a red shade color and a TSR greater than 20.

Example 8

Using the method of Example 7, a tan shaded finished paint may be made by adding 0.015 L (0.5 fluid ounces) each of No. 1977 Predispersed Yellow colorant and No. 1935 Predispersed Red Colorant (both from CCA/EPS) to the Example 3 base paint and mixing using the vibratory shaker for 3 minutes. The resulting custom-tinted paint would have a tan shade color and a TSR greater than 20.

Example 9

Using the method of Example 7, a green shaded finished paint may be made by adding 0.03 L (1 fluid ounce) of No. 1921 Predispersed Green colorant from CCA/EPS to the Example 3 base paint and mixing using the vibratory shaker for 3 minutes. The resulting custom-tinted paint would have a green shade color and a TSR greater than 20.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A custom color paint or stain tinting system comprising a dark-colored non-infrared-absorptive liquid base paint or stain, and a point-of-sale array of concentrated liquid colorants which are substantially free of infrared-absorptive pigments and which when dispensed into the dark-colored base paint or stain will provide custom-tinted non-infrared-absorptive paints or stains in lightened shades and a variety of tints.

2. A system according to claim 1 wherein the base paint or stain has a Total Solar Reflectance greater than 10%.

3. A system according to claim 1 wherein the base paint or stain has a Total Solar Reflectance greater than 20%.

4. A system according to claim 1 wherein the base paint or stain has an L* value less than 50.

5. A system according to claim 1 wherein the base paint or stain has a Total Solar Reflectance greater than 15% and an L* value less than 35.

6. A system according to claim 1 further comprising a white liquid base paint or stain.

7. A system according to claim 1 further comprising a gray liquid base paint or stain containing white pigment and non-infrared-absorptive dark pigment.

8. A system according to claim 1 wherein the base paint or stain contains one or more organic black pigments.

9. A system according to claim 1 wherein the base paint or stain contains one or more mixed metal oxide black pigments.

10. A system according to claim 1 wherein the base paint or stain contains one or more pigments comprising a single or mixed metal oxide formed from aluminum, antimony, bismuth, boron, chromium, cobalt, gallium, indium, iron, lanthanum, lithium, magnesium, manganese, molybdenum, neodymium, nickel, niobium, silicon, tin, vanadium or zinc.

11. A system according to claim 1 wherein the base paint or stain is substantially free of infrared-absorptive pigment.

12. A system according to claim 1 wherein the base paint or stain does not contain infrared-absorptive pigment.

13. A system according to claim 1 wherein the colorant array comprises at least seven colorants respectively containing non-infrared-absorptive white, green, blue, red, yellow, yellow oxide and red oxide pigments.

14. A system according to claim 13 wherein the colorant array further comprises at least three colorants respectively containing non-infrared-absorptive magenta, medium yellow and orange pigments, and the colorant array contains no more than 12 colorants.

15. A system according to claim 1 wherein each colorant in the colorant array may be added to a clear base paint in an amount sufficient to provide an opaque 40 μm dry thickness coating film having a Total Solar Reflectance of at least 10.

16. A system according to claim 1 wherein the colorants in the colorant array do not contain infrared-absorptive pigment.

17. A system according to claim 1 wherein the base paint or stain is packaged in a container with a volume of about 0.2 to 20 L equipped with an openable and recloseable lid, cap or other closure for an opening through which colorant may be dispensed into the base paint or stain and having a headspace of at least about 9% of the total container volume, and wherein the colorants in the colorant array are packaged in containers with a volume of about 0.5 to about 5 L from which colorant may be supplied to an automated or manual colorant dispenser and thence into the base paint or stain.

18. A system according to claim 1 further comprising an automated dispenser having a minimum fluid dispensing quantity less than <0.3 mL and wherein the colorant array includes three colorants respectively containing non-infrared-absorptive yellow oxide, red oxide and black pigment which may be dispensed from such dispenser into the base paint or stain whenever a brown oxide or raw umber tint is required.

19. A system according to claim 1 wherein the custom-tinted non-infrared-absorptive paints or stains contain less than 8 wt. % volatile organic compounds based upon the total custom-tinted paint or stain weight.

20. A system according to claim 1 wherein the custom-tinted non-infrared-absorptive paints or stains contain less than 2 wt. % volatile organic compounds based upon the total custom-tinted paint or stain weight.

* * * * *